July 19, 1966
G. F. GUGLIOTTA
3,261,123
CASTING ACCESSORY FOR FISHING TACKLE
Filed Feb. 8, 1963
2 Sheets-Sheet 1
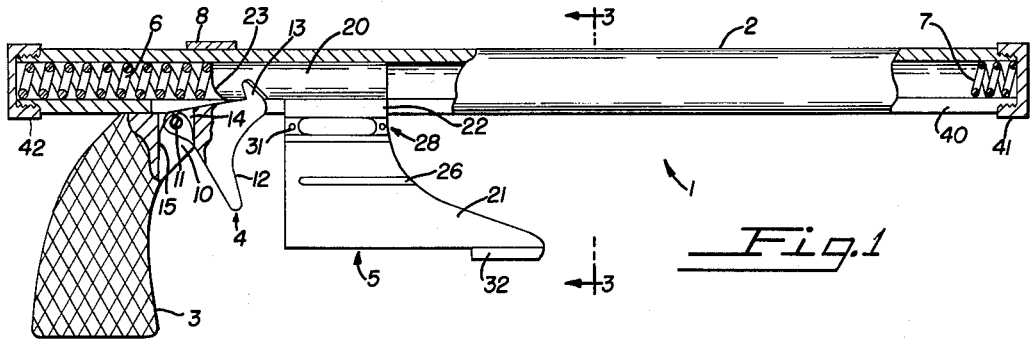
Fig.1
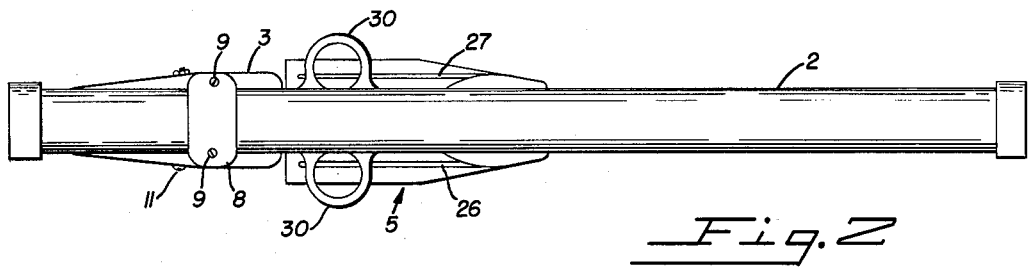
Fig.2
Fig.3
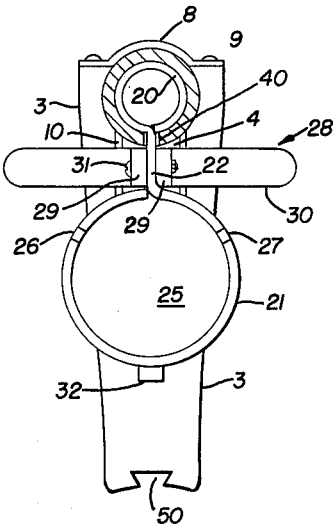
Fig.4
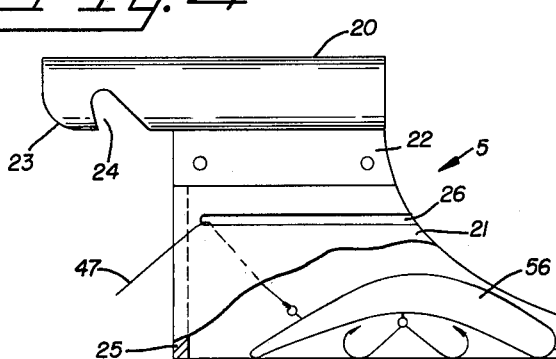
INVENTOR.
GUY F. GUGLIOTTA
BY
Leon F. Herbert
ATTORNEY July 19, 1966  G. F. GUGLIOTTA  3,261,123
CASTING ACCESSORY FOR FISHING TACKLE
Filed Feb. 8, 1963  2 Sheets-Sheet 2
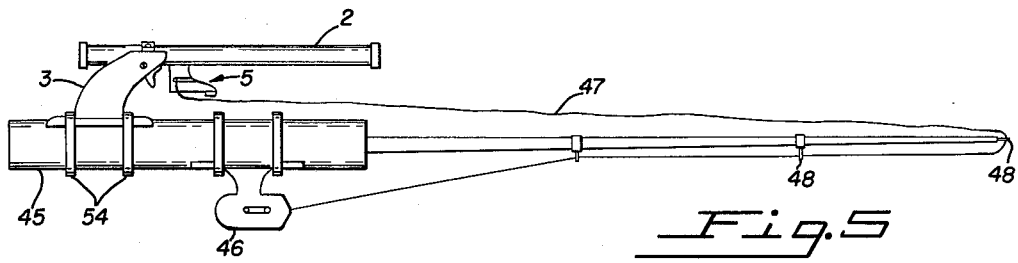
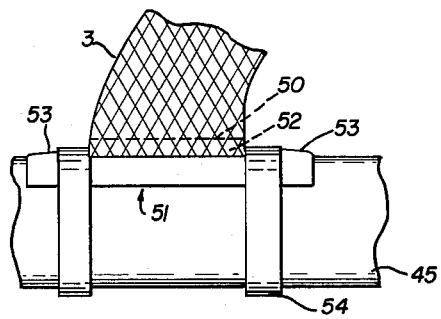
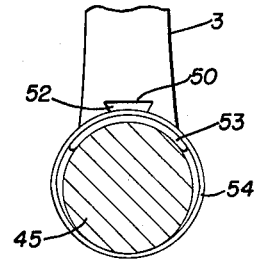
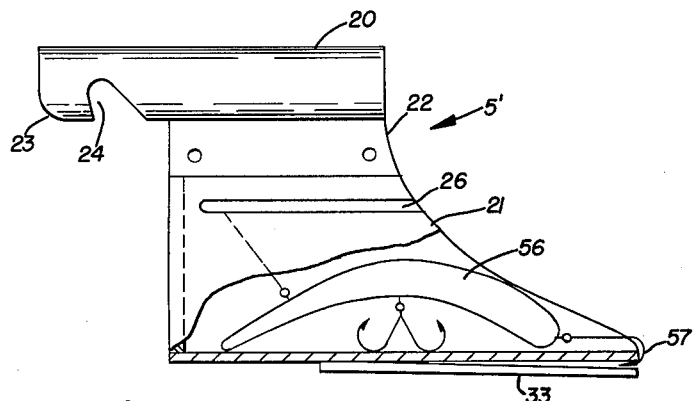
INVENTOR.
GUY F. GUGLIOTTA
BY
Leon F. Herbert
ATTORNEY

United States Patent Office 3,261,123
Patented July 19, 1966

3,261,123
CASTING ACCESSORY FOR FISHING TACKLE
Guy F. Gugliotta, Los Altos Hills, Calif.
(Apt. 608, 620 McCully St., Honolulu, Hawaii)
Filed Feb. 8, 1963, Ser. No. 257,264
7 Claims. (Cl. 43—19)

This invention relates to fishing tackle and more particularly to a mechanical casting device for projecting a fishing lure. As used herein the term "lure" includes cut or live natural bait as well as artificial devices.

There are many occasions where terrain or foilage make it impossible to cast a fishing lure to a desired location with conventional casting techniques. In addition, the novice often has difficulty making accurate casts, even in the absence of such impediments.

The need for a casting accessory has long been recognized and a number of solutions have been proposed. Although the previous casting devices have provided some degree of solution, they have not been completely successful. In many cases an attempt has been made to design a casting device in such a way that it incorporates a reel and even some semblance of a rod into an entirely new type of tackle which is not suited to the desires of the majority of fishermen. The casting device of this invention is to be distinguished from these cases of a combined new type of tackle in that this invention relates to a casting device which can be used with conventional rods and reels, particularly spinning reels. The action of the rod and reel is in no way altered by the casting device once the cast is made. Further, the design is such that the rod and reel can also be used to make the cast in conventional manner when it is decided that the casting device is not required.

Accordingly, the general purpose of this invention is to provide an improved casting device and particularly an improved device of the type which is to be used in connection with conventional fishing tackle.

More specifically, it is an object of the invention to provide a casting device which is relatively light in weight and so shaped that it can be easily held in one hand while a conventional rod and reel is held in the other, or can be attached to a conventional rod with little or no effect upon the normal action of the rod.

Another object of the invention is to provide a casting device which is safe and easy to use and also relatively quiet in operation.

A further object of the invention is to provide a casting device which is simple and inexpensive to manufacture.

An additional object of the invention is to provide a casting device in which the lure carrying member includes simple means for preventing the lure from accidental displacement due to force of gravity when the casting device is pointed downwardly.

Another object of the invention is to provide a casting device in which the carrier which projects the lure is designed to minimize the possibility of the lure becoming entangled in the line during projection.

Other and further objects and features of advantage will become apparent from the following detailed description, wherein reference is made to the accompanying drawings in which:

FIGURE 1 is a side view of the casting device in cocked condition, with parts cut away;

FIGURE 2 is a top view of the device as shown in FIGURE 1;

FIGURE 3 is an enlarged cross sectional view on the line 3—3 of FIGURE 1;

FIGURE 4 is a side view on the scale of FIGURE 3, showing the plunger and lure carrier assembly cut away to show a lure in place;

FIGURE 5 is a side view of the device on reduced scale attached to a conventional rod and reel;

FIGURE 6 is an enlarged fragmentary side view of the mounting of the device on the rod;

FIGURE 7 is an end view of FIGURE 6; and

FIGURE 8 is a view of the plunger and lure carrier assembly similar to FIGURE 4 but showing a modified lure-holding arrangement.

Referring to the drawings in more detail, FIGURE 1 shows the casting device 1 comprising a straight guide member or barrel 2, a pistol grip type handle 3 with a trigger 4, a plunger and lure carrier assembly 5, a firing spring 6, and a buffer spring 7.

The barrel 2 is preferably made of metal pipe, and since the driving force is a spring rather than an explosive, the barrel can be of relatively thin, lightweight metal or even plastic. The handle 3 is made of wood, plastic, or lightweight metal. The handle is conveniently attached to the barrel by a metal or plastic strap 8, which fits over the barrel and is attached to the handle by screws 9, as shown in FIGURE 2. The handle has a trigger opening 10, in which the trigger 4 is pivotally supported by a small bolt 11, fitted into a bore through the handle. The trigger has a finger portion 12 and a plunger-engaging latch portion 13. The rear of the trigger is provided with a centrally located spring-receiving slot 14. One end of a spring 15 abuts the rear wall of the trigger opening 10 and the other end abuts the front wall of the spring slot 14 in the trigger. Thus the spring 15 urges the trigger counterclockwise into the locking position shown in FIGURE 1.

The plunger and lure carrier assembly 5 comprises a plunger 20, a lure carrier 21 and a connecting piece 22. Although the assembly 5 can obviously be made in various ways, the preferred construction is to make the assembly from relatively thin sheet metal bent into the two cylindrical portions 20 and 21 connected by the straight portion 22, as shown best in FIGURE 3. The free edges of the formed sheet are preferably welded to the ends of the straight portion 22. The lower rear end of the plunger 20 is curved at 23 to provide a camming surface to depress the trigger latch 13 when the assembly 5 is moved rearwardly to cock the device. In addition, the bottom of the plunger is provided with a notch 24 which engages the trigger latch to hold the device in cocked condition. A metal closure disk 25 is welded in the read end of the lure carrier 21. The lure carrier is also provided with a slot 26 on one side and preferably a second slot 27 on the other side. Both of the slots open to the front of the carrier and are for the purpose of receiving the line attached to a lure in the carrier as will be hereinafter described in more detail. Preferably, the carrier and plunger assembly is provided with a cocking grip 28.

The cocking grip comprises a pair of identical members, each having a base portion 29 abutting the straight portion 22 of the plunger and carrier assembly. The sides of the cocking grip members are shaped to provide a pair of apertured finger portions 30 disposed on opposite sides of the assembly. The grip members are held in place by small bolts 31 through the attachment portion 29 and through the straight part 22 of the assembly. The lure carrier is also provided with means for holding the lure against accidental displacement. In one form the holding means is a magnet 32 attached to the under surface of the carrier 21 by an adhesive or other suitable means. In an alternative form, the holding means is a spring 33, as shown in FIGURE 8. The spring is similarly attached by adhesive or other suitable means.

The plunger 20 has a sliding fit in the open bore of the barrel 2 and the bottom of the barrel is provided with a slot 40 which slidingly receives the straight portion 22 of the plunger and lure carrier assembly. Slot 40 opens at the front of the barrel so that the assembly 5 and buffer spring 7 can be inserted in the barrel and extends rearwardly far enough to permit the assembly to be moved to the cocking position, as shown in FIGURE 1. The slot 40 is widened at its rearward end to receive the portion of the trigger which extends upwardly into the barrel. The front of the barrel is closed by a cap 41 threadedly engaged thereon. Any other type of abutment, such as a pin, is suitable for the end of the barrel as long as it is removable and will prevent the buffer spring 7 from falling out. The rear end of the barrel is closed by a wall 42 which can be threaded, or can be welded or otherwise permanently attached. The removable nature of the front wall makes assembly and removal of springs 6 and 7 and the plunger and carrier assembly a very simple process.

The device thus far described can obviously be held in one hand while a conventional fishing rod is held in the other hand. Alternatively, the casting device can be mounted on a conventional rod 45 as shown in FIGURE 5. The rod carries a conventional spinning reel 46 and the line 47 extends from the reel through the usual guides 48 to the lure in the lure carrier 21. In order to provide for mounting the casting device on a rod, the bottom of handle 3 has a dove-tail slot 50, which receives a mounting plate 51 having a central mating dove-tail section 52 and curved attachment projections 53 extending to the front and rear of the handle. The device with mounting plate is attached to the rod by pressing slip rings 54 over the projections 53. The mounting plate can be either left in place to become a permanent part of the handle or can be attached only when the device is mounted on a rod, the shapes 50 and 52 having a tight sliding fit for this purpose.

Operation of the casting device is as follows, starting with the device in the uncocked condition, in which the plunger and lure carrier assembly is forward of the position shown in FIGURE 1. The handle 3 is grasped in one hand and the other hand is placed over the barrel with two fingers extending down through the cocking ring finger portions 30. The plunger and lure carrying assembly is then pulled back, compressing spring 6, until the trigger latch 13 enters notch 24 in the plunger. Then the desired lure is inserted in the carrier 21, for example, the lure shown at 56 in FIGURE 4. Although the stated sequence is preferred, the lure can be inserted before cocking. In any event when the lure is inserted, or at least before firing, the line 47 which extends from the lure to the reel portion of the conventional rod and reel tackle is led through one of the slots 26, 27 in the lure carrier. In this way the lure leads the line upon discharge, and the line does not become fouled in the hooks or other parts of the lure. In order to prevent the lure from falling out of the lure carrier when the casting device is aimed downwardly, one of the hooks 56 is placed over the front edge of the lure carrier and is gripped by the magnet 32 or spring 33. In addition to holding the lure in place, this arrangement results in the lure being discharged in the same position it will be retrieved which further prevents fouling of the line. It should be understood that the operation of the device is essentially the same whether it is attached to or separate from the rod.

After the casting device is cocked, and the lure properly inserted, the device is aimed, and then fired by pulling the trigger 4. When the trigger is pulled, the plunger 20 is driven rapidly forward by spring 6. The piston and lure carrier is stopped by the buffer spring 7 and the lure continues forward, the strength of magnet 32 or spring 33 being negligible compared to the force of the discharge. When the casting device is used separately from the rod, the device is held in one hand during firing and the rod is held in the other. The existence of the two line slots 26, 27 make it possible to hold the device in either hand and still lead the line into the lure carrier from the side on which the rod is held. After firing, the device is put down and both hands are devoted to the rod and reel. When the device is mounted on the rod, it is simply left there while both hands are devoted to the rod and reel in normal fashion.

Although preferred embodiments of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A casting device comprising a straight guide member, a handle for said guide member, a lure carrier, and means including said guide member for projecting said carrier along a straight line, said lure carrier having a tubular rear portion, said tubular rear portion being open at its forward end, means for holding a lure in said tubular portion without closing said open end, and the wall of said tubular portion having a slot therein, said slot opening to the front of the tubular portion and ending adjacent the rear end of said tubular portion, whereby a lure can be placed in said carrier with the line-attached end of the lure toward the rear of said tubular portion and with the line from the lure passing out of the rear part of the carrier through said slot.

2. A casting device comprising a straight guide member, a handle for said guide member, a lure carrier, and means for projecting said carrier along said guide member, said lure carrier having a hollow shape open at one end, and means on the underside only of said lure carrier for retaining a lure therein when said open end is pointed downwardly, said retaining means being restrained against movement across said open end of the lure carrier.

3. A casting device as claimed in claim 2 in which said retaining means is a magnet attached to the underside of said lure carrier adjacent said open end of the carrier.

4. A casting device as claimed in claim 2 in which said retaining means is a spring attached to the underside of said lure carrier.

5. A casting device comprising a barrel having a slot extending therealong, a plunger and lure carrier assembly projecting through said slot with the plunger portion thereof inside the barrel and the carrier portion outside the barrel, a finger grip projecting from each side of said assembly and connected to a portion of the assembly which is outside the barrel, spring means in said barrel for forcing said plunger along said barrel, and trigger means for releasably holding said plunger against the force of said spring, said trigger means and the finger grip being located on the same side of said barrel.

6. A casting device comprising a barrel having a downwardly extending handle adjacent the rear end thereof, a plunger slideably received in said barrel, resilient propelling means for driving said plunger along said barrel, a lure carrier below said barrel, said barrel having an elongated slot on the underside thereof extending to the front end of the barrel, a connecting piece extending through said slot and joining said plunger to said lure carrier, plunger-abutment means removably attached to the barrel adjacent the front end of the barrel, a trigger for releasably holding said plunger toward the handle end of the barrel against the force of said propelling means, said lure carrier having a tubular rear portion, said tubular rear portion being open at its forward end, means for holding a lure in said tubular portion without closing said open end, and said tubular portion being provided with a forwardly opening slot in the wall thereof.

7. A casting device as claimed in claim 6 wherein said plunger, lure carrier and connecting piece are a single sheet of metal providing a plunger which is cylindrical, a lure carrier which is tubular, and a connecting piece which is a flat portion of said sheet.

References Cited by the Examiner

UNITED STATES PATENTS

| | | | |
|---|---|---|---|
| 331,380 | 12/1885 | Divine | 43—22 |
| 1,245,074 | 10/1917 | Ward. | |
| 1,451,295 | 4/1923 | Driver et al. | 43—57.5 |
| 2,048,061 | 7/1936 | Donato. | |
| 2,247,561 | 7/1941 | Rowe | 43—19 |
| 2,531,418 | 11/1950 | Fitzharris | 43—19 |
| 2,540,340 | 2/1951 | Limblade | 43—57.5 |
| 2,569,604 | 10/1951 | Hall | 43—19 |
| 2,605,569 | 8/1952 | Kronhaus et al. | |
| 2,761,717 | 9/1956 | Mahlke. | |
| 2,795,884 | 6/1957 | Wright | 43—19 |
| 2,813,368 | 11/1957 | Knoles | 43—57.5 |
| 3,015,182 | 1/1962 | Tuttle et al. | 43—19 |
| 3,026,644 | 3/1962 | Raider | 43—19 |

FOREIGN PATENTS 344,258  3/1960  Switzerland.

SAMUEL KOREN, *Primary Examiner.*

FRANCIS R. CHAPPELL, *Examiner.*

W. H. CAMP, *Assistant Examiner.*